F. BENTLEY.
SPRING WHEEL.
APPLICATION FILED JUNE 20, 1919.
1,379,517.
Patented May 24, 1921.
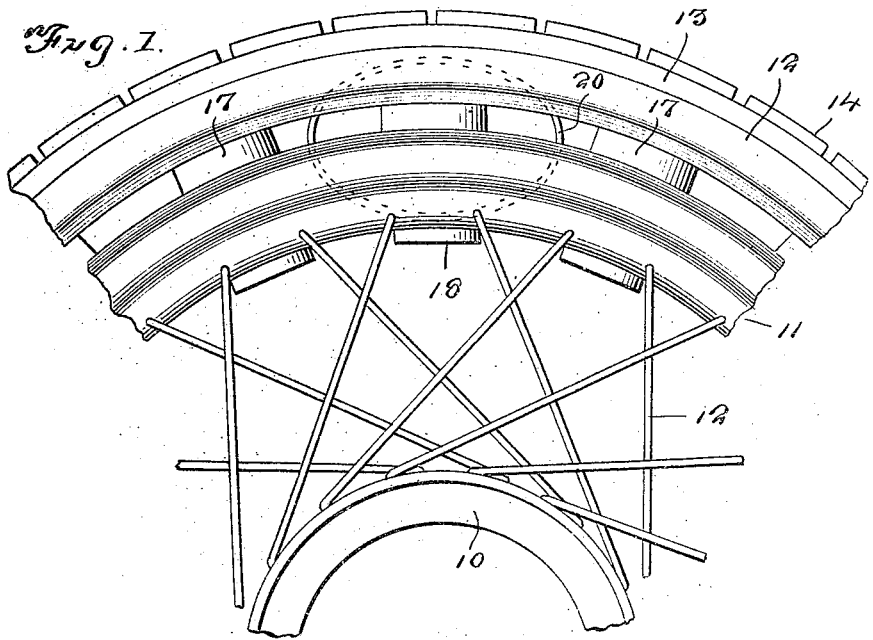
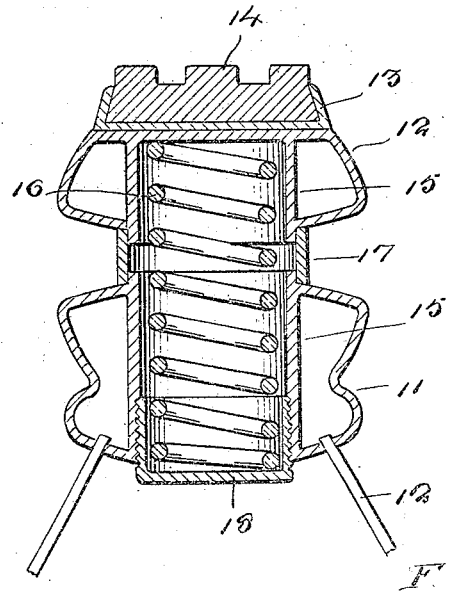
F. Bentley
INVENTOR.
WITNESS:
BY
Victor J. Evans
ATTORNEY.

UNITED STATES PATENT OFFICE.

FRED BENTLEY, OF DETROIT, MICHIGAN.

SPRING-WHEEL.

1,379,517.

Specification of Letters Patent.  Patented May 24, 1921.

Application filed June 20, 1919. Serial No. 305,475.

*To all whom it may concern:*

Be it known that I, FRED BENTLEY, a subject of the King of Great Britain, residing at Detroit, in the county of Wayne and State of Michigan, have invented new and useful Improvements in Spring-Wheels, of which the following is a specification.

This invention relates to spring wheels, and aims to provide a construction which is strong, durable, and attractive in appearance, being designed for use with a solid tire but possessing all the resiliency afforded by wheels equipped with pneumatic tires.

The nature and advantages of the invention will be more readily apparent when the following detail description is taken in connection with the accompanying drawings, the invention residing in the construction, combination and arrangement of parts as claimed.

In the drawing forming part of the specification like numerals of reference indicate similar parts in the several views and wherein:—

Figure 1 is a side elevation of a portion of a wheel constructed in accordance with my invention.

Fig. 2 is a transverse sectional view therethrough

Referring more particularly to the drawings in detail, 10 indicates the hub of the wheel, 11 the felly thereof which is connected to the hub by means of the spokes 12. Concentrically disposed in spaced relation to the felly 11 is a tire carrying rim 12 formed with its flanges 13 for supporting a solid tire 14. As illustrated, both the felly 11 and the tire carrying rim are hollow, and in each of which is arranged a plurality of tubular members 15. These members are disposed in radial alinement so that each pair may receive the terminals of a coil spring 16 which is interposed between the felly 11 and the tire carrying rim. It is of course to be understood that any number of springs may be used to afford the wheel proper resiliency, this however depending upon the size of the wheel. For the purpose of preventing dust, dirt or other foreign matter from obtaining access to the tubular members 15 and the springs 16, I provide each spring with a sleeve 17 of rubber or other suitable flexible material, the sleeves surrounding the intermediate portion of the spring and arranged between the felly 11 and the tire carrying rim 12. The springs are inserted in the tubular members from the inner periphery of the felly 11, the members 15 carried by the felly being opened for this purpose. After the springs have been inserted in the tubular members, a cup 18 is threaded into each of the tubular members carried by the felly, the cups constituting a bottom for said members. The construction and arrangement is such that access may be readily had to the interior of the tubular members for the repair of the spring or the substitution of a new one when the occasion requires.

With a view of preventing undue circumferential movement of the tire carrying rim 12 with relation to the felly 11, I make use of a plurality of oval shaped springs 20 which are arranged between the felly 11 and the tire carrying rim 12 as shown in Fig. 1. Any number of these springs may be utilized as found necessary, these springs contributing to the resiliency of the wheel as a whole.

While it is believed that from the foregoing description the nature and advantages of the invention will be apparent, I desire to have it understood that I do not limit myself in this connection in that such changes may be resorted to when desired as fall within the scope of what is claimed.

Having thus described my invention what I claim is:—

A resilient wheel comprising a hub, a felly having openings therein, a tire carrying rim, tubular members radiating from the felly from the walls of said openings, said tubular members being open at both ends, tubular members projecting inwardly from the tire carrying rim in alinement with the first mentioned tubular members, coiled springs fitted within the tubular members carried by the felly through the openings therein, the tubular members forming integral parts of the felly and rim, cup-shaped members threaded into the said openings of the felly and also into the tubular members formed therein, and constituting bottoms for said tubular members, said springs being received by the tubular members formed on the tire carrying rim and spacing the latter from the felly, and a flexible band interposed between each pair of alined tubular members inclosing the space between the latter for the purpose specified.

In testimony whereof I affix my signature.

FRED BENTLEY.